United States Patent
Gibson et al.

(10) Patent No.: US 9,734,446 B2
(45) Date of Patent: Aug. 15, 2017

(54) POST APPLICATION EDITING OF MULTIRESONATOR CHIPLESS RADIO FREQUENCY IDENTIFICATION (RFID)

(71) Applicant: XEROX CORPORATION, Norwalk, CT (US)

(72) Inventors: George A. Gibson, Fairport, NY (US); James R. Larson, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 1 day.

(21) Appl. No.: 14/943,959

(22) Filed: Nov. 17, 2015

(65) Prior Publication Data

US 2017/0140258 A1    May 18, 2017

(51) Int. Cl.
G06K 7/10 (2006.01)
G06K 19/077 (2006.01)

(52) U.S. Cl.
CPC ... G06K 19/07773 (2013.01); G06K 7/10356 (2013.01); G06K 7/10366 (2013.01)

(58) Field of Classification Search
CPC .......... G06K 7/10356; G06K 7/10366; G06K 19/07773
USPC ....................................... 235/492; 340/572.1
See application file for complete search history.

(56) References Cited

U.S. PATENT DOCUMENTS

| 4,233,383 A | 11/1980 | Horgan |
| 4,363,711 A | 12/1982 | Kuehnle |
| 5,861,809 A * | 1/1999 | Eckstein ............. G08B 13/242 29/592.1 |
| 7,653,982 B2 | 2/2010 | Chopra et al. |
| 2005/0179548 A1 | 8/2005 | Kittel et al. |
| 2008/0218352 A1 | 9/2008 | Miles et al. |
| 2008/0224871 A1 | 9/2008 | Bolotin et al. |
| 2009/0231139 A1 | 9/2009 | Heurtier |
| 2009/0301382 A1* | 12/2009 | Patel ....................... G01D 3/10 116/201 |

(Continued)

FOREIGN PATENT DOCUMENTS

| AT | WO 2009126999 A1 * 10/2009 ......... G06K 19/0723 |
| CN | 202650044        1/2013 |

(Continued)

OTHER PUBLICATIONS

Author Unknown, "Photoresistor," from Wikipedia, https://en.wikipedia.org/wiki/Photoresistor, Dec. 3, 2015, 3 pages.

(Continued)

*Primary Examiner* — Toan Ly
(74) *Attorney, Agent, or Firm* — MH2 Technology Law Group LLP

(57) ABSTRACT

A method and structure for a radio frequency identification (RFID) system including an RFID tag. The RFID tag can include a dampener configured to dampen a resonation of a resonator. Prior to dampening the resonation of the resonator using the dampener, the RFID tag may be configured to transmit a first response signal from a transmit antenna. Subsequent to dampening of the resonation of the resonator using the dampener, the RFID tag may be configured to transmit a second response signal that is different from the first response signal. The dampener may include a chemical agent or a fusible link.

15 Claims, 6 Drawing Sheets

(56) References Cited

U.S. PATENT DOCUMENTS

2013/0285477 A1 10/2013 Lo et al.
2016/0358058 A1* 12/2016 Gibson .............. G06K 19/0672

FOREIGN PATENT DOCUMENTS

| EP | 1218771 B1 | 12/2004 |
| FR | 2992758 A1 | 3/2014 |
| WO | 2009126999 A1 | 10/2009 |
| WO | WO2015061827 A1 | 5/2015 |

OTHER PUBLICATIONS

Preradovic et al., "Multiresonator-Based Chipless RFID System for Low-Cost Item Tracking," IEEE Trasnactions on Microwave Theory and Techniques, vol. 57, No. 5, May 2009, pp. 1411-1419.
Gibson et al., "Printing System Architecture for Encoding Chip-Less RFID Tags in Real Time," U.S. Appl. No. 14/733,536, filed Jun. 8, 2015.

* cited by examiner

POST APPLICATION EDITING OF MULTIRESONATOR CHIPLESS RADIO FREQUENCY IDENTIFICATION (RFID)

TECHNICAL FIELD

The present teachings relate generally to chipless radio frequency identification (RFID) tags and, more particularly, to structures and methods for making and using customizable chipless RFID tags.

BACKGROUND

Radio frequency identification (RFID) technology has become increasingly commonplace for use in inventory tracking, loss prevention, and other uses. An RFID system may include a transponder or tag that is placed on an object and an interrogator or reader that wirelessly receives information transmitted by the tag. RFID tags may be broadly classified as active tags that include a local power source such as a battery, or passive tags that are activated by electromagnetic waves generated by the reader that induce a current in an antenna within the tag.

RFID tags can include an electronic circuit that may be in the form of a chip or integrated circuit (IC). The chip may store data that is communicated to the reader. In contrast, a chipless RFID tag has neither an integrated circuit nor discrete active electronic components, and may be printed directly onto a substrate resulting in a lower cost than a chipped RFID tag.

A chipless RFID tag may include a receive antenna that intercepts interrogator output, a transmit antenna that broadcasts data that is received by the interrogator, and a plurality or array of resonators (i.e., a multiresonator) electrically coupled between the receive antenna and the transmit antenna. During use, the reader may output a broad band or spectrum of radio frequencies. Depending on the configuration of the multiresonator, one or more of the radio frequencies may include a frequency-dependent antenna load that is intercepted by the receive antenna and causes the multiresonator to resonate. The resonation modifies the signal that is transmitted by the transmit antenna and may be received by the interrogator. Each RFID tag may be encoded by etching a conductive film to result a specific set of patterned resonant structures that form the multiresonator. For unique identification of a particular tag from a set of tags, each transponder must be made to include a unique multiresonator design, which is an expensive process.

The receive antenna, the transmit antenna, and resonators may be prepared using one or more patterning techniques to pattern a conductive layer, for example a metal layer. Various patterning techniques may be used, for example, stamping, chemical etching, mechanical etching, laser etching, direct writing of a metal layer, vapor deposition, etc. In one technique, a foil master is etched away to create the final structure.

As a practical matter, RFID technology uses radio frequencies that have much better penetration characteristics to material than do optical signals, and will work under more hostile environmental conditions than bar code labels. Therefore, the RFID tags may be read through paint, water, dirt, dust, paper, human bodies, concrete, or through the tagged item itself. RFID tags may be used in managing inventory, automatic identification of cars on toll roads, security systems, electronic access cards, keyless entry and the like.

Thus, unless an RFID system is designed merely to detect the presence or absence of a tag, each RFID tag from a set of tags must include a different resonator configuration that is formed during manufacture. The resonator configuration is hardwired into the RFID tag, and thus the tag includes one resonator configuration during the entire lifetime of the tag.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an embodiment, a radio frequency identification (RFID) device includes an RFID tag having a receive antenna, a transmit antenna, at least one resonator electrically coupled between the receive antenna and the transmit antenna, and a dampener configured to selectively dampen resonation of the resonator. Prior to dampening of the resonation of the resonator using the dampener, the RFID tag is configured to transmit a first response signal from the transmit antenna and, subsequent to dampening of the resonation of the resonator using the dampener, the RFID tag is configured to transmit a second response signal that is different from the first response signal from the transmit antenna.

In another embodiment, a method for operating a radio frequency identification (RFID) system may include transmitting an interrogation signal from an interrogator to a receive antenna of an RFID tag and transmitting a first response signal from the RFID tag to the interrogator. Further, subsequent to the transmitting of the first response signal, the method includes dampening a resonation of a resonator within the RFID tag. Subsequent to the dampening of the resonation of the resonator within the RFID tag, the interrogation signal is transmitted from the interrogator to the receive antenna of the RFID tag, and a second response signal is transmitted from the RFID tag to the interrogator, wherein the second response signal is different from the first response signal.

BRIEF DESCRIPTION OF THE DRAWINGS

The accompanying drawings, which are incorporated in, and constitute a part of this specification, illustrate embodiments of the present teachings and, together with the description, serve to explain the principles of the disclosure. In the figures.

Figure 1:
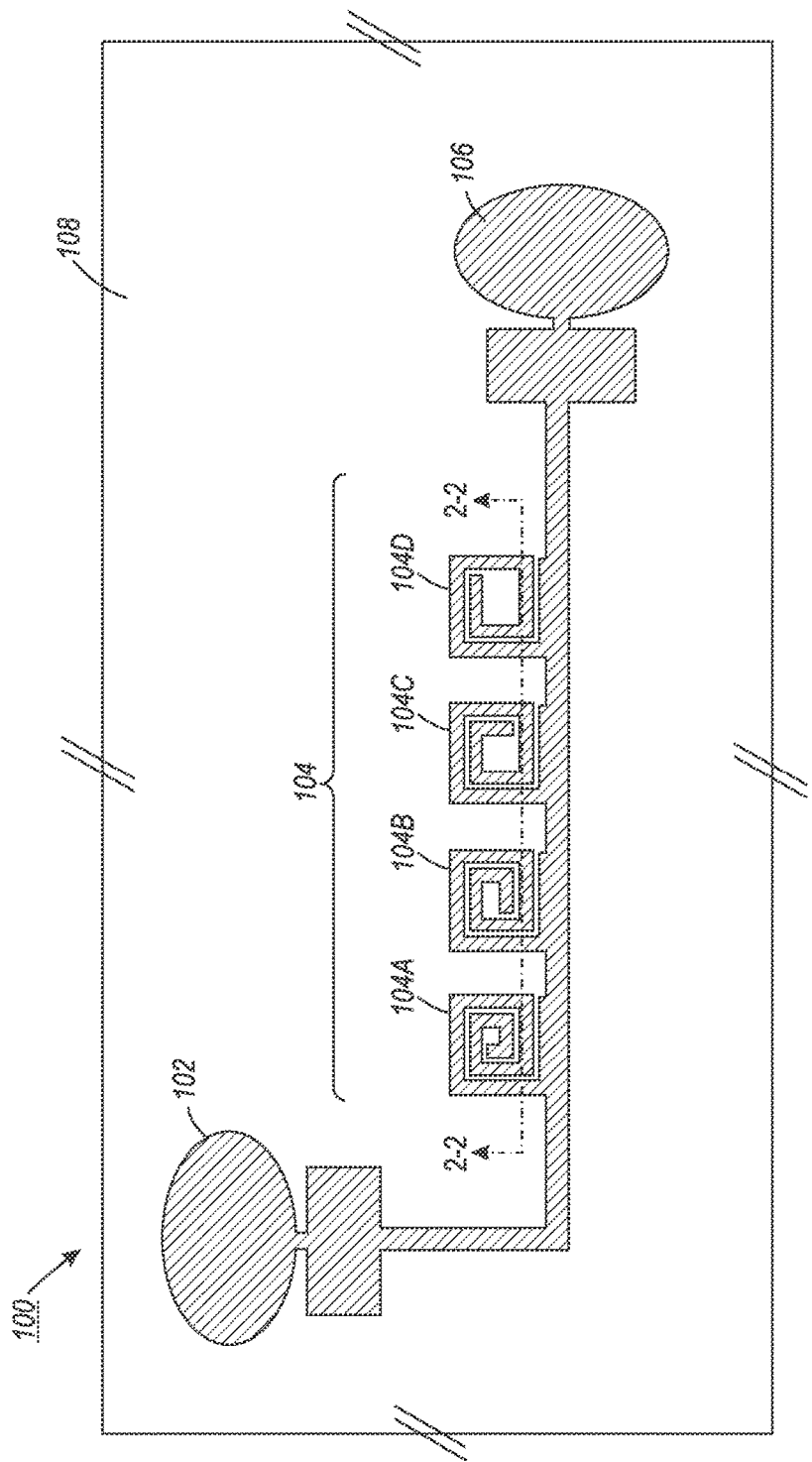
FIG. 1 is a plan view.

It should be noted that some details of the FIGS. have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same or like parts.

As used herein, unless otherwise specified: the term "chipless" describes an RFID transponder that has neither an integrated circuit nor discrete electronic components, such as a transistor or coil; the term "resonator" or "resonant structure" refers to a structure having an associated resonance corresponding to a characteristic frequency; the term "spectral signature" refers to at least one identifying resonance associated with an applied excitation frequency; the term "tag" refers to a transponder or a combination of a transponder and other structures that may include a carrier on which the transponder is disposed or device package within which the transponder is disposed. A tag may be attached to an article; the term "transponder" refers to a device such as a tag that receives signals, such as those transmitted by an interrogator, and sends one or more response signals in response to the received signals; the term "etched" refers to a process by which portions of a material are removed, such as a chemical etch, a mechanical etch, a laser etch or ablation, etc.; the term "security overlayer" refers to a layer that, when tampered with, damages, destroys or otherwise modifies a structure on which the security overlayer is disposed; the term "generic RFID transponder" means an RFID transponder that has an associated resonant structure for each frequency domain applied by a transmitter, such as an interrogator.

In a conventional RFID system, a tag is programmed to output a frequency in response to an interrogation signal from an interrogator. The frequency or response signal that is output by the tag is hardwired into the tag during formation of the tag, such that the frequency output by the tag in response to the interrogator signal does not change during the lifetime of the tag. In one particular use, an RFID tag may be attached to an article that is being manufactured so that the location of the article, for example, in a manufacturing line, may be monitored. The location of a particular RFID tag, and thus the article to which it is attached, may be noted and stored within memory of a computer system. For example, it may be noted that an article has exited a particular manufacturing step in a manufacturing line, and this information may be associated with the particular article to which the tag is attached and then stored in the memory of the computer system. Thus while the manufacturing history of the article is available from the memory of the computer system, the tag itself has no manufacturing history.

Embodiments of the present teachings can include a tag that, in a first state, is configured to output a first frequency or set of frequencies in response to a signal from an interrogator. The tag may be altered to a second state such that the tag is configured to output a second frequency or set of frequencies (hereinafter, collectively, a frequency) in response to the signal from the interrogator, wherein the second frequency is different than the first frequency. The alteration may be performed after the tag has been fully manufactured. Further, the alteration may be performed after the tag has been attached to an article and has been in use to identify the article. In an embodiment, a tag may output the first frequency in response to an interrogation prior to the article to which the tag is attached undergoing some manufacturing step, set of steps, inspection, or some other condition. After the article undergoes the condition, the tag may be altered to the second state such that the tag outputs the second frequency in response to the interrogation signal, wherein the second frequency is different from the first frequency.

The alteration of the tag may be any physical change or chemical change of the multiresonator that causes the frequency output by the multiresonator to change. The change may include a dampening effect to one or more resonators of the plurality of resonators that form the multiresonator, such that the resonation frequency of the dampened resonator is increased to a frequency that is not output by the interrogator. Various types of alterations of one or more resonators are described herein that result in a tag outputting a first response frequency prior to the alteration and outputting a second, different response frequency after the alteration. It will be appreciated that more than one resonator may be altered at a time to transform the tag from the first state to the second state. Further, one resonator or more than one resonator may be selectively and individually altered at different times so that the tag outputs two, three, four, or more different frequencies at different times so that a plurality of different conditions of the article to which the tag is attached may be identified.

Figure 2:
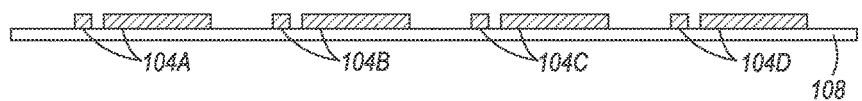
FIG. 2 is a cross section along 2-2 of FIG. 1, of an in-process RFID tag in accordance with an embodiment of the present teachings.

FIG. 1 is a top view, and FIG. 2 is a magnified cross section along 2-2 of FIG. 1, depicting a portion of a transponder 100 that is part of an RFID tag. Transponder 100 can include a receive antenna 102, a multiresonator 104 including a plurality of resonators 104A-104D, and a transmit antenna 106. As depicted in FIG. 1, each resonator 104A-104D has a unique spiral pattern that causes each resonator to resonate at a different frequency. It will be appreciated that an RFID tag can include other structures that are not depicted for simplicity, while various depicted structures may be removed or modified.

In use, the interrogator outputs a broad spectrum of frequencies that may be received by the receive antenna 102, and that may cause one or more of the resonators 104A-104D to resonate. The number of resonators 104A-104D that resonate and the amplitude at which they resonate results in an output frequency that is translated into an analog signal that is transmitted as a response signal by the transmit antenna 106 to the interrogator. For example, and without limitation to the frequencies specified, resonator 104A may resonate at 2.97 gigahertz (GHz), resonator 104B may resonate at 2.66 GHz, resonator 104C may resonate at 24 GHz, and resonator 104D may resonate at 24.3 GHz. Because the analog signal generated during an interrogation and transmitted by the transmit antenna 106 is unique to the specific tag from a plurality of tags as a result of the unique pattern of resonators 104A-104D, the interrogator can identify the specific tag from the plurality of tags. The transponder 100 may be disposed on a carrier 108 such as directly on an article or on an intermediate adhesive backing for attaching onto an article. The carrier 108 may be a substrate on which the RFID transponder is initially fabricated or may be a carrier on which an RFID transponder is transferred onto after it is fabricated. A carrier 108 having an adhesive backing may allow the RFID transponder to be easily attached (i.e., tagged) onto an article.

The in-process transponder of FIGS. 1 and 2 may be manufactured by one of ordinary skill in the art, for example, by depositing and etching one or more metal layers, for example copper, and depositing or otherwise positioning one or more blanket and/or patterned dielectric layers.

After forming the structure of FIGS. 1 and 2, additional structures may be formed that allow alteration of the frequency output by the transponder 100. In a first state, prior to alteration, the tag 100 is configured to output a first response frequency from the transmit antenna 106 in response to an interrogation signal 910 (FIG. 9) from an interrogator 902. In a second state, subsequent to alteration, the tag 100 is configured to output a second response frequency from the transmit antenna 106 in response to the interrogation signal from the interrogator, wherein the second frequency is different than the first frequency.

Figure 3:
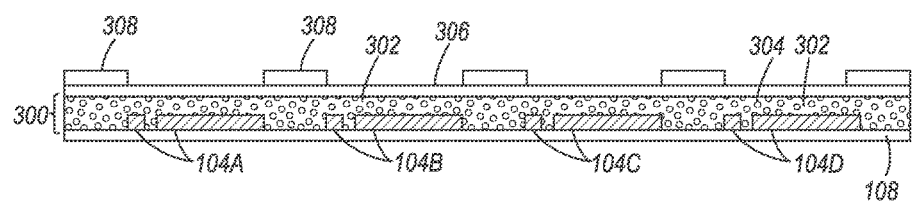
FIG. 3 is a cross section of a multiresonator after forming a microencapsulation layer in accordance with an embodiment of the present teachings.
Figure 5:
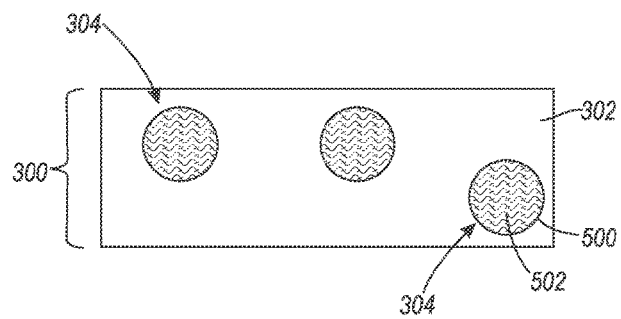
FIG. 5 is a magnified schematic depiction of part of a microencapsulation layer in accordance with an embodiment of the present teachings.

FIG. 3 depicts the structure of FIG. 2 after forming a microencapsulation layer 300 in accordance with an embodiment. The microencapsulation layer 300 may include a carrier material 302 impregnated with a plurality of microencapsulated particles or microcapsules 304. The carrier material 302 may be chemically inert with respect to the material of the multiresonator 104. The microencapsulated particles 304 may include an outer membrane 500 that encapsulates a chemical agent 502 as depicted in the magnified partial cross section of FIG. 5. FIG. 3 further depicts an optional protective coating layer 306 that may seal the chemical agent 502 within the transponder 100 and may also provide a security overlayer.

Various techniques are contemplated for dispensing the microencapsulation layer 300 in liquid or paste form, for example, spray coating, screen printing, spin coating, etc. In another embodiment, a liquid carrier may be mixed with the microencapsulated particles 304, then the liquid carrier may be cured to form a solid carrier microencapsulation layer 300. The microencapsulation layer 300 may be adhered to an upper surface of the multiresonator 104 using, for example, a pressure-sensitive adhesive, a curable adhesive, etc. (not individually depicted for simplicity). In another embodiment, the liquid carrier remains liquid after application to the upper surface of the multiresonator 104. The liquid carrier material 302 and the microencapsulated particles 304 may be held in place by the protective layer 306, which seals the microencapsulation layer 300 within the RFID tag 100 during use.

Additionally, FIG. 3 depicts a registration layer 308 aligned with, and provides an indication of the physical location of, the resonators 104A-104D. The registration layer 308 may be a pigment (e.g., ink, paint, etc.) that is printed or stamped on an underlying layer (e.g., on the coating layer 306, if used, or the microencapsulation layer 300) that provides indicia regarding the physical location of each individual resonator 104A-104D. The registration layer 308 may also be a rigid layer having openings therein that provide indicia regarding the physical location of the resonators 104A-104D. Other types of registration layers 308 are contemplated.

In an embodiment, the microencapsulation layer 300 may be formed as a liquid or paste that is dispensed onto the upper surface of the FIG. 2 structure. The carrier material 302 can include, for example, a thermoplastic, a polymer such as heat-curable polymer or an ultraviolet-curable polymer, diluents as required and other suitable materials.

Figure 6:
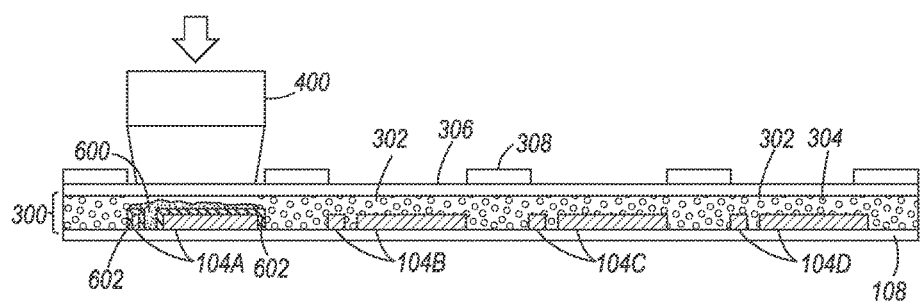
FIG. 6 is a cross section during alteration of a resonator of the resonator array in accordance with another embodiment of the present teaching.

In an embodiment, the microencapsulated particles 304 can include an outer membrane 500 that is chemically inert with respect to the material of the multiresonator 104 and a chemical agent 502 that may dampen resonation of one or more of the resonators 104A-104D. Depending on the mechanism used for dampening the resonation as described below, the chemical agent 502 may physically dampen the resonation (FIG. 4), or the chemical agent 502 may be chemically reactive with the material of the multiresonator 104 (FIG. 6). The microencapsulated particles 304 including chemical agent 502 encapsulated as an inner liquid core by the outer membrane 500 may be made using any suitable processing technique such as a coacervation process, for example, a complex coacervation process.

For example, the chemical agent 502 may dampen the resonation of one or more of the resonators 104A-104D by filling in a portion, or all, of the space between the various parts of the resonator with an electrical conductor. In the embodiment of FIG. 1, this includes filling in the space between physically adjacent arm portions of the spiral. The chemical agent 502 may be a flowable electrical conductor, for example, a highly concentrated salt solution with an appropriate oligomer, that may be cured to a solid state after flowing over the one or more resonators. In an embodiment, a salt such as sodium tetrafluoroborate ($NaBF_4$) with an oligomer such as polyethylene glycol (PE) may be used. In an embodiment, the salt solution may include a salt concentration of from about 1.0 grams/liter (g/L) and about 15.0 g/L. The oligomer selected may include a material that has a relatively large molal effect on water viscosity.

Figure 4:
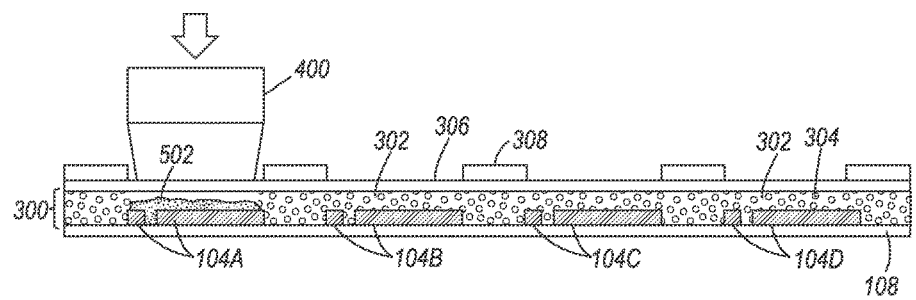
FIG. 4 is a cross section of the FIG. 3 embodiment during alteration of a resonator of the resonator array.

In this embodiment, after forming a structure similar to that depicted in FIG. 3, one or more of the resonators 104A-104D may be altered using the microencapsulation layer 300 and, more specifically, the chemical agent 502, to alter the resonant frequency of the selected resonator. FIG. 4 depicts alteration of resonator 104A. In this embodiment, a tool 400 such as a stylus, a punch, or another tool 400 may be aligned, for example, by an operator, with the selected resonator 104A using the indicia provided by the registration layer 308. Sufficient pressure is applied between the tool 400 and the transponder 100 to rupture the membranes 500 of the microencapsulated particles 304, thereby releasing the chemical agent 502. In this embodiment, the chemical agent 502 may be an electrical conductor that flows over the resonator 104A after rupturing of the membrane 500 to physically contact resonator 104A as depicted in FIG. 4. The chemical agent 502 may then be cured, for example, by heating the transponder to an elevated temperature for a duration sufficient to cure the conductor. In another embodiment, the conductor may be curable at room temperature after a period of time.

In another embodiment the chemical agent 502 may dampen the resonation of one or more resonators 104A-104D through a chemical reaction with the material of the resonator. The chemical agent 502 (numbered 600 in FIG. 6) may be an oxidizing agent (an oxidizer) that converts the resonator 104A from a metal to a metal oxide 602 (FIG. 6) upon contact with the resonator 104A, thereby altering the resonation frequency of the resonator 104A. In one embodiment, the oxidizer may oxidize only an upper surface of the resonator as depicted in FIG. 6; in another embodiment, the entirety of the resonator 104A may be oxidized by the oxidizer.

Various oxidizing agents are contemplated for use as the oxidizer 600 of FIG. 6, for example, hydrogen peroxide ($H_2O_2$), benzoyl peroxide or reactive metal salts, alkali permanganates, univalent gold salts or divalent platinum salts for instance. In an embodiment, the oxidizing agent 600 is chosen such as to be chemically reactive with the material of the resonator 104A but has little or no reaction with the carrier material 302.

In the embodiments described above, the chemical agent 502 within the microencapsulation layer 300 is provided at a volume that is sufficient to carry out the dampening effect of the selected resonator but is insufficient to migrate across the transponder to an adjacent resonator, which may result in inadvertent dampening of the adjacent resonator. In an embodiment, the microencapsulated particles may have an average width or diameter of from about 2 microns to about 30 microns, or from about 5 microns to about 20 microns, and may include from about 10 weight percent (wt %) to about 60 wt % of the microencapsulation layer 300.

Figure 7:
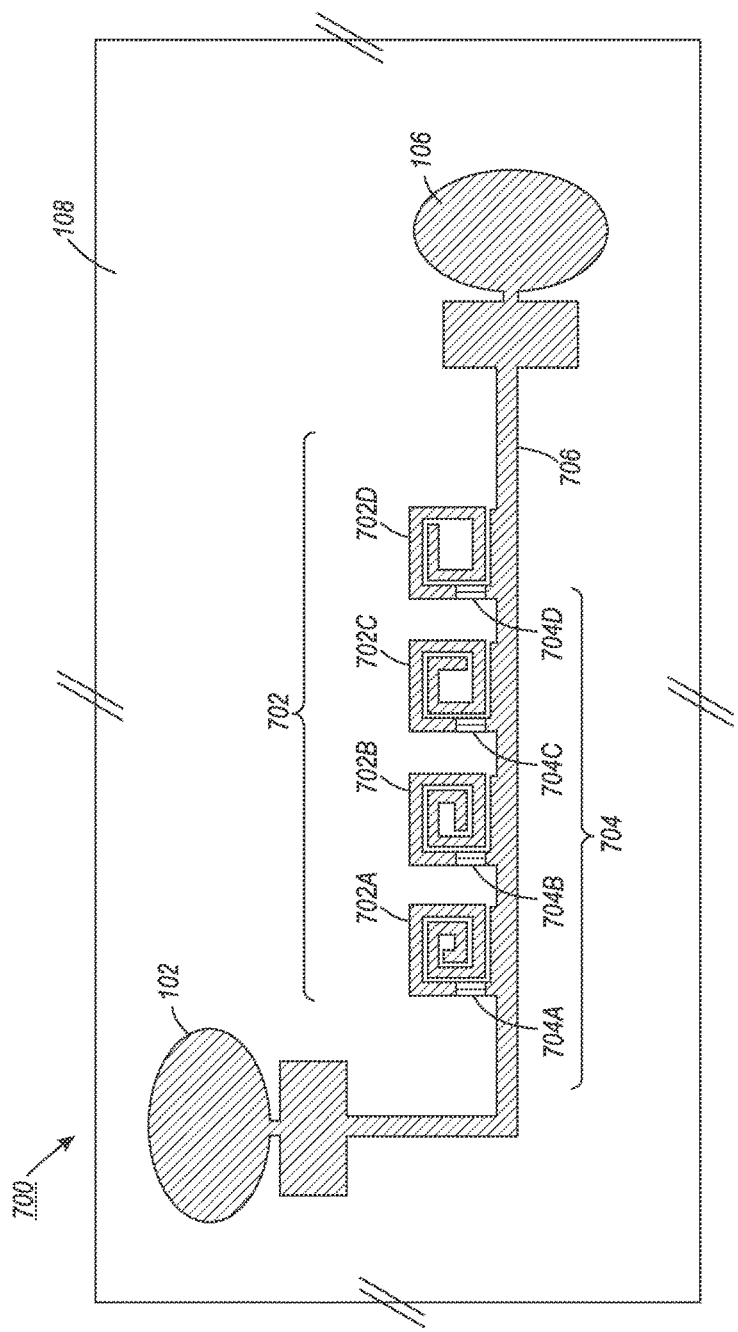
FIGS. 7 and 8 are plan views of another embodiment of the present teachings that includes the use of one or more fusible links.

In another embodiment, a transponder 700 may include one or more resonators 702A-702D of a multiresonator 702 that may be individually altered and dampened through the use of one or more fusible links 704A-704D that, initially, physically and electrically short one of the resonators 702A-702D to a resonator base 706 or serves to alter the effective free path length of the resonator such that the characteristic frequency of the modified resonator is outside the spectral band emitted and analyzed by the interrogator. Each fusible link 704 may include a fine gage wire or a eutectic as depicted. In FIG. 7, after manufacture of the transponder 700, each fusible link 704A-704D electrically shorts one of the resonators 702A-702D of the multiresonator 702 to the resonator base 706. In the FIG. 7 configuration, resonation of each resonator 702A-702D of the multiresonator 702 in response to an interrogation signal by the interrogator contributes to the response signal that is output on the transmit antenna 106.

Figure 8:
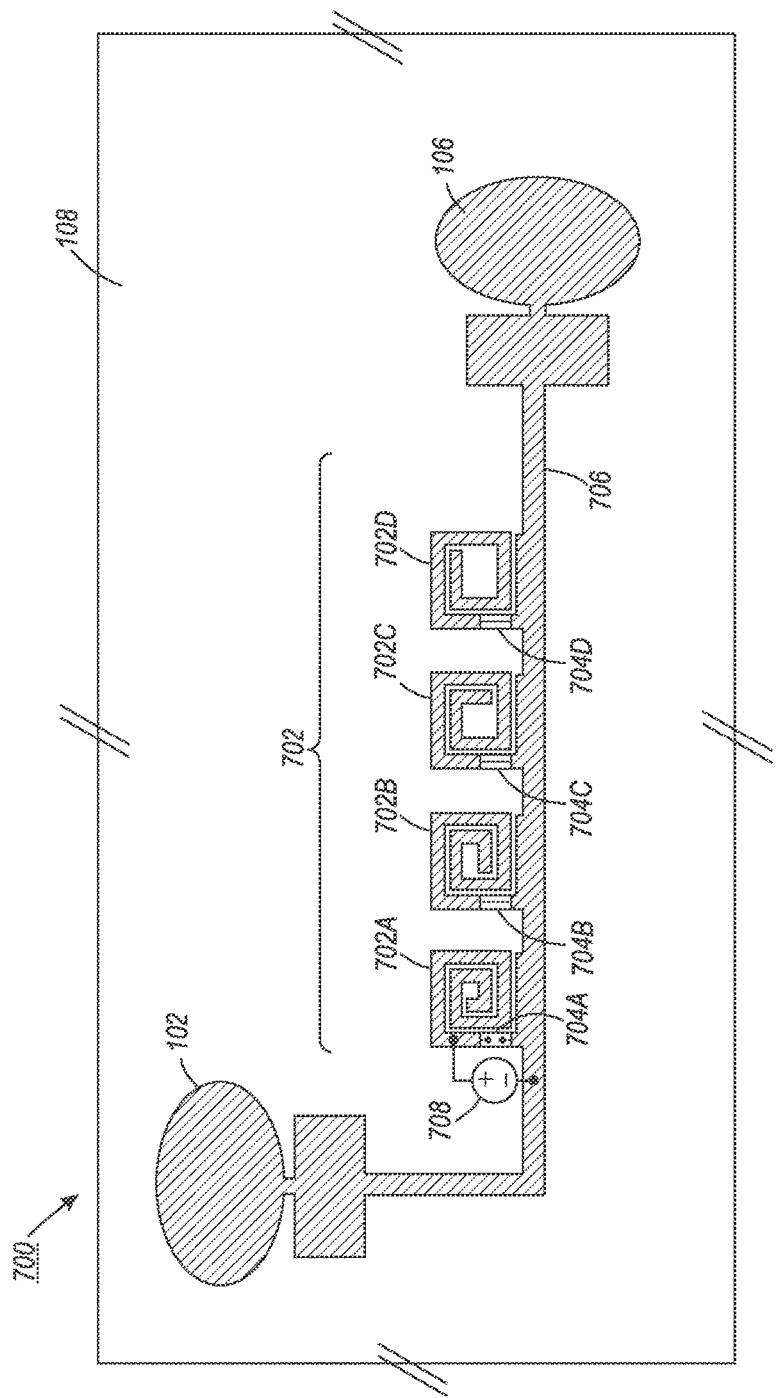

Subsequently, a current 708 may be placed across one or more of the fusible links as depicted in FIG. 8, thereby melting or blowing the fusible link and creating an electrical open between the selected resonator 702A and the resonator base 706. The electrical open between the selected resonator 702A and the resonator base 706 effectively removes selected resonator 702A from the multiresonator 702, such that resonation of resonator 702A no longer contributes to the response signal output by the transmit antenna 106 as a result of the interrogation signal from the interrogator. In an embodiment, the fusible links 704 may each be electrically coupled to a source of power by electrically conductive traces or interconnects that terminate in conductive pads (not individually depicted for simplicity). In one embodiment, conductive pins of a handheld module may be placed in physical contact with the conductive pads, then power may be applied to the conductive pads which electrically conducts along the conductive traces to the fusible link, which places the current 708 across the fusible link, thereby blowing the fusible link.

In an embodiment, the fusible link may include a metal wire. The metal wire may be formed from a metal such as copper, aluminum, lead/tin eutectic, or carbon loaded polymer. The metal wire may have an average diameter of from about 1 micron to about 1000 microns, or from about 1 micron to about 300 microns, or from about 1 micron to about 80 microns. To melt, sever, or otherwise blow the wire of the fusible link, a current of from about 100 microamps to about 250 microamps may be applied through the fusible link. While this current is sufficient to blow the fusible link, it is unlikely to cause damage to other transponder structures, which are formed to be much larger and more robust to the application of the current through the fusible link.

Other methods for blowing one or more of the fusible links 704A-704D are contemplated. For example, the current 708 across the fusible link may be applied through the use of inductive coupling, depending on the final RFID device design.

Figure 9:
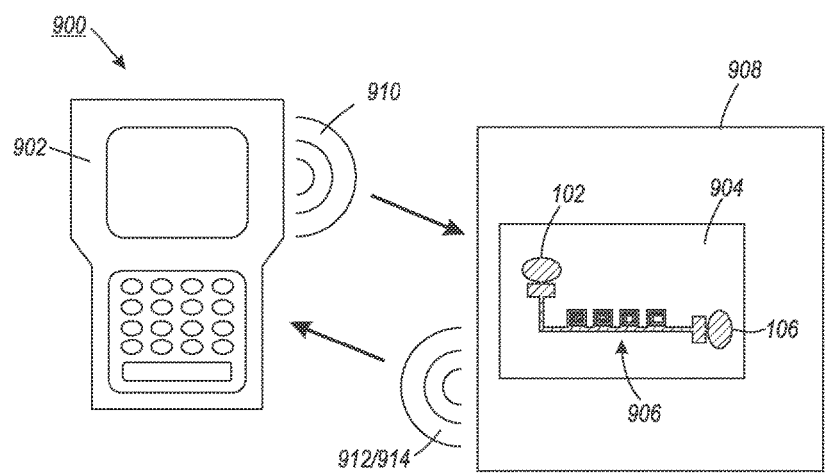
FIG. 9 is a schematic depiction of an RFID system according to an embodiment of the present teachings.

FIG. 9 is a schematic depiction of an RFID system 900 in accordance with an embodiment of the present teachings. The RFID system 900 may include an interrogator 902 and an RFID tag 904. The RFID tag 904 can include a receive antenna 102, a transmit antenna 106, and a multiresonator 906 as described above, including a plurality or array of resonators, that form a transponder. In use, the tag 904 may optionally be attached to an article 908.

In an embodiment, each resonator of the multiresonator 906 may be in a first state and unaltered from an as-manufactured state. The interrogator 902 may output an interrogation signal 910 that is received by the RFID tag 904 and, more specifically, by the receive antenna 102 of the RFID tag 904. In response to the interrogation signal 910, each resonator of the multiresonator 906 resonates, which causes a first analog signal to be transferred to the transmit antenna 106. Data relative to the first analog signal is output by the transmit antenna 106 in the form of a first response signal 912, which may be received by the interrogator 902.

Subsequently and optionally, some processing act may be performed on the article 908. In response, an operator may alter one or more of the resonators as described above to "mark" the articles 908 as having gone through the processing act. Alteration of the resonator places the resonator into a second state that is different from the first state, wherein the alteration changes the resonation of the altered resonator, and thus the resonation of the multiresonator 906, in response to the interrogation signal 910. The interrogator 902 may output the interrogation signal 910 that is received by the RFID tag 904 and, more specifically, by the receive antenna 102 of the RFID tag 904. In response to the interrogation signal, the multiresonator 906 resonates, which causes a second analog signal that is different from the first analog signal to be transferred to the transmit antenna 106. Data relative to the second analog signal is output by the transmit antenna 106 in the form of a second response signal 914 that is different from the first response signal 912, which may be received by the interrogator 902.

It will be appreciated that this process of altering one or more of the resonators of the multiresonator 906 can be repeated any number of times, depending on the number of resonators in the resonator array 906.

In an embodiment, an RFID tag may include only one resonator that may be altered from a first state to a second state such that the transponder has two possible signals in response to an interrogation signal. In another embodiment, a multiresonator may include two or more resonators, where each resonator may be altered from a first state to a second state independent of the state of the other resonators in the resonator array, such that the transponder has a plurality of possible signals in response to an interrogation signal.

Thus an embodiment of the present teachings can provide an RFID tag or an RFID transponder that can be altered from a first state that outputs a first response signal in response to an interrogation signal to a second state that outputs a second response signal in response to the interrogation signal that is different from the first response signal. The RFID tag may be altered after manufacturing of the RFID tag has been completed, and after the RFID tag in the first state has been used. The RFID tag may be altered through the use of a dampener that is configured to dampen the resonation of the resonator when the resonator is altered from the first state to the second state. In an embodiment, the dampener can include a chemical agent may be selectively released to physically contact the resonator. In an embodiment, the chemical agent may be an electrical conductor that fills in one or more gaps between various portions of the resonator, thereby dampening the resonation of the resonator. In another embodiment, the chemical agent may be an oxidizer that at least partially oxidizes the resonator, thereby dampening the resonation of the resonator. In another embodiment, the dampener can include a fusible link that electrically couples (e.g., electrically shorts) the resonator to other portions of the RFID tag or transponder, such as to a resonator base. To dampen the resonator, the fusible link is melted, severed, or otherwise blown to create an electrical open between the resonator to the other portions of the RFID tag, such as between the resonator and the resonator base.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A radio frequency identification (RFID) device comprising an RFID tag, the RFID tag comprising:
   a receive antenna;
   a transmit antenna;
   a plurality of resonators electrically coupled between the receive antenna and the transmit antenna;
   a dampener configured to selectively and individually dampen resonation of each resonator of the plurality of resonators wherein, prior to dampening of the resonation of one of the resonators using the dampener, the RFID tag is configured to transmit a first response signal from the transmit antenna and, subsequent to dampening of the resonation of the resonator to be dampened using the dampener, the RFID tag is configured to transmit a second response signal that is different from the first response signal from the transmit antenna, wherein the dampener comprises a microencapsulation layer comprising a plurality of microencapsulated particles, and each microencapsulated particle comprising an outer membrane and a chemical agent encapsulated by the outer membrane;
   a protective layer overlying the microencapsulation layer, wherein the protective layer provides a security overlayer that is configured to damage the microencapsulation layer when tampered with and is further configured to seal the chemical agent within the RFID tag during use; and
   a registration layer on the protective layer, wherein the registration layer provides indicia regarding a physical location of each of the plurality of resonators such that the physical location of each resonator of the plurality of resonators may be individually identified and each resonator may be individually dampened.

2. The RFID device of claim 1, wherein the outer membrane of each microencapsulated particle is configured to be ruptured through an application of pressure to the microencapsulation layer.

3. The RFID device of claim 2, wherein the chemical agent is an electrical conductor.

4. The RFID device of claim 3, wherein the electrical conductor comprises a material selected from aluminum, copper, silver, platinum, lead tin, conductive organic composites and combinations thereof.

5. The RFID device of claim 2, wherein the chemical agent is an oxidizing agent configured to individually oxidize each resonator of the plurality of resonators.

6. The RFID device of claim 5, wherein the oxidizing agent comprises a material selected from hydrogen peroxide, inorganic oxidizing agents, and combinations thereof.

7. The RFID tag of claim 1, wherein the registration layer is a pigment on the protective layer.

8. The RFID tag of claim 1, wherein the registration layer is a rigid layer having a plurality of openings therein, wherein each opening provides the indicia regarding the physical location of each resonator of the plurality of resonators.

9. A method for operating a radio frequency identification (RFID) system, comprising:
- transmitting an interrogation signal from an interrogator to a receive antenna of an RFID tag, wherein the RFID tag comprises a plurality or resonators;
- transmitting a first response signal from the RFID tag to the interrogator;
- subsequent to the transmitting of the first response signal, dampening a resonation of one resonator of the plurality of resonators within the RFID tag, wherein the dampening comprises:
  - locating a position of the resonator to be dampened using a registration layer that provides indicia that identifies a physical location of each resonator of the plurality of resonators such that the physical location each resonator of the plurality of resonators may be individually identified and each resonator may be individually dampened;
  - applying a pressure to a protective layer at the physical location of the resonator to be dampened that is identified by the indicia, wherein the indicia and the protective layer overlies a microencapsulation layer; and
  - rupturing a plurality of microencapsulated particles and releasing a chemical agent from the plurality of microencapsulated particles onto the resonator to be dampened during the applying of the pressure to the protective layer;
- subsequent to the dampening of the resonation of the resonator within the RFID tag, transmitting the interrogation signal from the interrogator to the receive antenna of the RFID tag; and
- transmitting a second response signal from the RFID tag to the interrogator, wherein:
  - the second response signal is different from the first response signal;
  - the protective layer is a security overlayer that damages the microencapsulation layer when tampered with; and
  - the protective layer further seals the chemical agent within the RFID tag subsequent to the rupturing of the plurality of microencapsulated particles.

10. The method of claim 9, wherein the chemical agent is an electrical conductor and the dampening further comprises curing the electrical conductor to solidify the electrical conductor subsequent to releasing the chemical agent onto the resonator to be dampened.

11. The method of claim 10, wherein the rupturing of the plurality of microencapsulated particles releases an electrical conductor selected from dispersed conductive metal particulates, conductive solutions, and combinations thereof.

12. The method of claim 9, wherein the chemical agent is an oxidizing agent and the dampening further comprises at least partially oxidizing the resonator subsequent to releasing the chemical agent onto the resonator to be dampened.

13. The method of claim 12, wherein the rupturing of the plurality of microencapsulated particles releases an oxidizing agent selected from hydrogen peroxide, organic peroxides, common inorganic oxidizing agents and combinations thereof.

14. The method of claim 9, further comprising:
- aligning a tool with the position of the resonator to be dampened, wherein the aligning of the tool with the registration layer aligns the tool with a pigment that is printed or stamped onto the protective layer; and
- rupturing the plurality of the microencapsulated particles at the location of the resonator to be dampened that is identified by the indicia.

15. The method of claim 9, further comprising:
- aligning a tool with the position of the resonator to be dampened, wherein the aligning of the tool with the registration layer aligns the tool with an opening in a rigid layer comprising a plurality of openings therein, wherein each opening of the plurality of openings identifies a position of each resonator of the plurality of resonators; and
- rupturing the plurality of the microencapsulated particles at the location of the resonator to be dampened that is identified by the indicia.

* * * * *